(12) United States Patent
Connell et al.

(10) Patent No.: US 9,485,900 B2
(45) Date of Patent: Nov. 8, 2016

(54) AGRICULTURAL IMPLEMENT PLUG DETECTION

(71) Applicant: Deere & Company, Moline, IL (US)

(72) Inventors: Richard Joseph Connell, Slater, IA (US); Noel Wayne Anderson, Fargo, ND (US); Robert Thomas Casper, Mingo, IA (US)

(73) Assignee: DEERE & COMPANY, Moline, IL (US)

( * ) Notice: Subject to any disclaimer, the term of this patent is extended or adjusted under 35 U.S.C. 154(b) by 86 days.

(21) Appl. No.: 14/499,294

(22) Filed: Sep. 29, 2014

(65) Prior Publication Data

US 2016/0088787 A1    Mar. 31, 2016

(51) Int. Cl.
| | | |
|---|---|---|
| *G06F 7/70* | (2006.01) | |
| *A01C 7/00* | (2006.01) | |
| *A01B 76/00* | (2006.01) | |
| *A01B 63/24* | (2006.01) | |
| *A01B 63/112* | (2006.01) | |

(52) U.S. Cl.
CPC .............. *A01B 76/00* (2013.01); *A01B 63/112* (2013.01); *A01B 63/24* (2013.01)

(58) Field of Classification Search
USPC ............................................. 701/50; 111/183
See application file for complete search history.

(56) References Cited

U.S. PATENT DOCUMENTS

| | | |
|---|---|---|
| 3,392,697 A | 7/1968 | Parrish et al. |
| 3,622,977 A | 11/1971 | Wakamatsu et al. |
| 5,936,234 A | 8/1999 | Thomas et al. |
| 6,070,539 A | 6/2000 | Flamme et al. |
| 6,389,999 B1 * | 5/2002 | Duello ................... A01C 5/064 111/200 |
| 6,438,506 B1 | 8/2002 | Yohpe et al. |
| 7,729,837 B2 | 6/2010 | Fujiwara et al. |
| 8,326,500 B2 | 12/2012 | Mariman et al. |
| 8,408,149 B2 | 4/2013 | Rylander |
| 2004/0206282 A1 * | 10/2004 | Sandoval ............... A01C 19/04 111/52 |
| 2009/0000533 A1 * | 1/2009 | Wendte ................... A01C 7/046 111/183 |
| 2010/0283603 A1 | 11/2010 | Yule et al. |
| 2012/0291680 A1 | 11/2012 | Rylander |
| 2013/0293167 A1 * | 11/2013 | Harris, III ................. H02P 5/50 318/400.13 |
| 2014/0116735 A1 * | 5/2014 | Bassett ................ A01B 61/044 172/2 |
| 2014/0312055 A1 * | 10/2014 | Rans ...................... A01C 7/046 221/258 |
| 2015/0351315 A1 * | 12/2015 | Wendte .................... A01C 7/12 111/183 |

OTHER PUBLICATIONS

European Search report in foreign counterpart application No. 15181972.9 dated Mar. 30, 2016 (7 pages).

* cited by examiner

*Primary Examiner* — Thomas G Black
*Assistant Examiner* — Tyler Paige

(57) ABSTRACT

A plug detection system for an agricultural implement with a ground-engaging tool may include a rotational speed sensor, a ground speed sensing system, and a controller. The rotational speed sensor may be configured to detect a rotational speed of the ground-engaging tool. The ground speed sensing system may be configured to detect a ground speed of the agricultural implement. The controller may be in communication with the rotational speed sensor and the ground speed sensing system and may be configured to determine a threshold rotational speed based on the ground speed and send an alert signal when the rotational speed is below the threshold rotational speed.

6 Claims, 6 Drawing Sheets

AGRICULTURAL IMPLEMENT PLUG DETECTION

FIELD OF THE DISCLOSURE

The present disclosure relates to agricultural implements. An embodiment of the present disclosure relates to a plug detection system for an agricultural implement.

BACKGROUND

Agricultural implements may be towed through fields to till or otherwise work the field. Certain of these agricultural implements may become plugged or jammed by soil or debris as they are towed through the fields. Such plugging may cause suboptimal performance of the agricultural implement, uneven surfaces in the field, or other problems that may require repair work. These issues may be exacerbated if the implement is plugged for a period of time.

SUMMARY

According to an aspect of the present disclosure, a plug detection system for an agricultural implement with a ground-engaging tool may include a rotational speed sensor, a ground speed sensing system, and a controller. The rotational speed sensor may be configured to detect a rotational speed of the ground-engaging tool. The ground speed sensing system may be configured to detect a ground speed of the agricultural implement. The controller may be in communication with the rotational speed sensor and the ground speed sensing system and may be configured to determine a threshold rotational speed based on the ground speed and send an alert signal when the rotational speed is below the threshold rotational speed.

According to another aspect of the present disclosure, an agricultural implement adapted to be moved by a vehicle comprising a data bus may include a ground-engaging tool, a sensor, and a controller. The sensor may be configured to provide a signal indicative of a rotational speed of the ground-engaging tool. The controller may be in communication with the data bus and the sensor. The controller may be configured to receive a ground speed of the agricultural implement via the data bus, compare the rotational speed to the ground speed, and send an alert signal if the rotational speed is below an acceptable range for the ground speed.

According to another aspect of the present disclosure, an agricultural implement adapted to be moved by a vehicle may include a plurality of ground-engaging tools, a plurality of wheels, a sensor, and a controller. The sensor may be configured to provide a signal indicative of a rotational speed of at least one of the ground-engaging tools. The controller may be configured to determine a ground speed of the agricultural implement, calculate a ratio of the rotational speed to the ground speed, compare the ratio to a threshold ratio; and send an alert signal if the ratio is below the threshold ratio.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
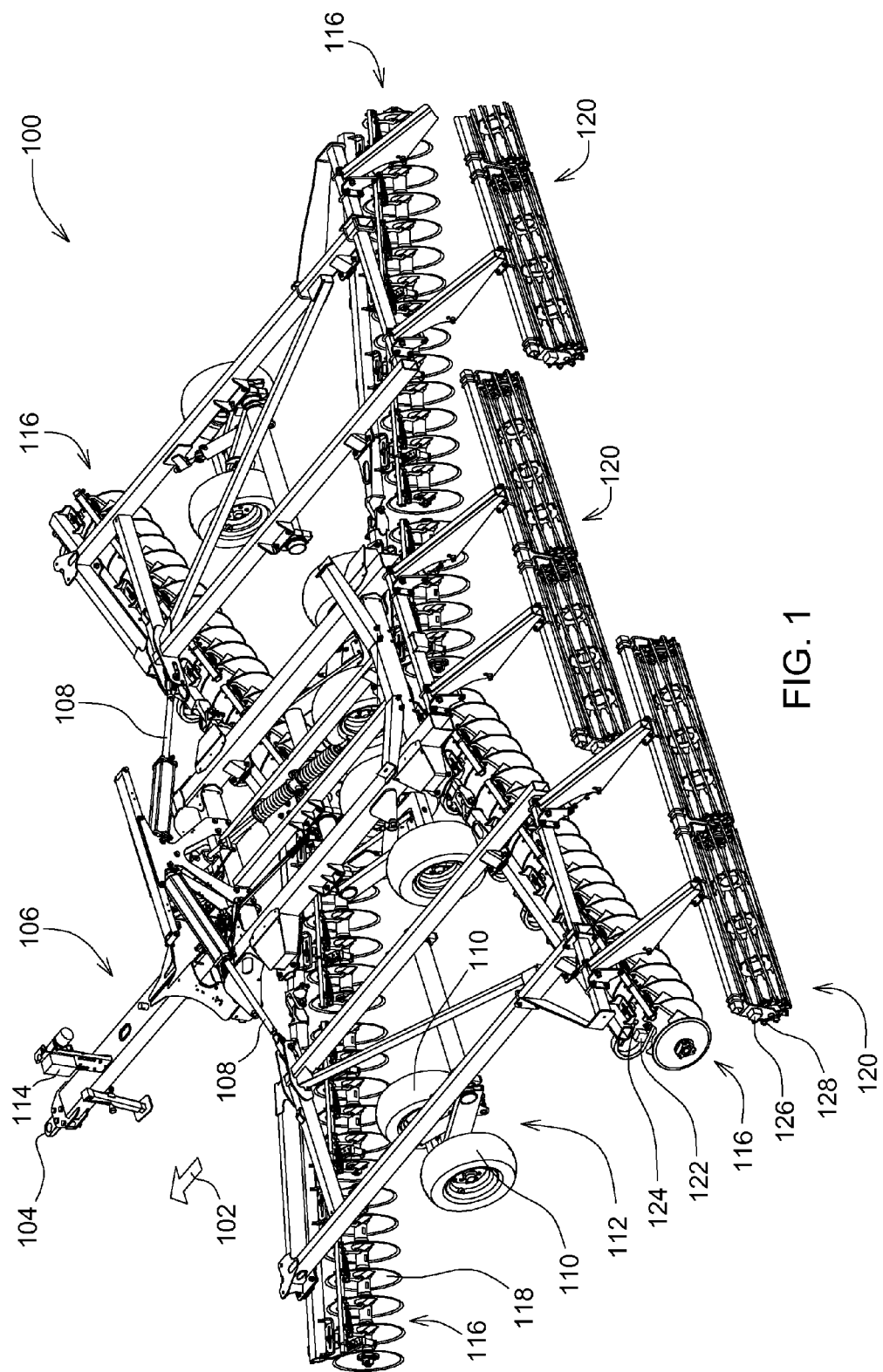
FIG. 1 is a perspective view of an agricultural implement.

FIG. 1 is a perspective view of agricultural implement 100. Alternative embodiments may involve different agricultural implements, including those with rolling baskets, disks, wheels, or drums, to name but a few possibilities. Implement 100 may be towed through a field, such as by an agricultural vehicle, in travel direction 102.

Implement 100 includes hitch 104 for pivotally connecting implement 100 to an agricultural vehicle so that it may be towed through a field under the power of the agricultural vehicle. In alternative embodiments, implement 100 may be partially or totally self-driven, such as by generating its own power or receiving power from an agricultural vehicle (e.g., transmitted mechanically, hydraulically, or electrically) and transmitting that power to one or more wheels or tracks of implement 100 (e.g., via a motor or transmission).

Frame 106 is affixed to hitch 104 and extends rearwardly from hitch 104 in a direction opposite the direction of travel 102. Frame 106 includes multiple interconnected rigid members, some of which are affixed to each other (e.g., via welds) while others are movably connected to each other (e.g., pivotally connected, slidably connected). Frame 106 may be foldable, such that it can be collapsed into a more compact configuration for transport or storage, then expanded prior to being towed through a field. Deploying mechanisms 108, double-acting hydraulic cylinders in this embodiment, may be used to collapse and expand frame 106. Alternatively, deploying mechanism 108 may be electric, pneumatic, or mechanical actuators, and may be powered by an agricultural vehicle or manual operation. Frame 106 provides strength and rigidity to implement 100, as well as attachment points for other components, including wheels 110, adjustment device 112, and ground-engaging tools.

Wheels 110 may be pivotally connected to frame 106 via adjustment device 112. Wheels 110 provide rolling support to implement 100 on the ground at a height and/or downward force which may be adjusted through adjustment device 112. Adjustment device 112 includes a hydraulic cylinder in fluid communication with valve 114 (hydraulic lines not shown in FIG. 1 for clarity), which may control the pressure and/or volume of fluid within adjustment device 112 so as to control the downward force of wheels 110, which may affect the height of frame 106 above wheels 110. Valve 114 may receive pressurized hydraulic fluid from a hydraulic source, such as through a hydraulic line connected to a hydraulic pump on the agricultural vehicle towing implement 100, and may meter such hydraulic fluid out to one or more functions, including deploying mechanisms 108 and a plurality of adjustment device 112. By controlling the downward force of wheels 110, adjustment device 112 and valve 114 may control the distribution of weight between wheels 110 and ground engaging tools connected to frame 106. For example, valve 114 may decrease the pressure and volume of fluid in adjustment device 112 to reduce the support to frame 106 provided by wheels 110 in order to increase the downward force exerted by ground-engaging tools connected to frame 106. Multiple sets of wheels 110 and adjustment device 112 may be used to support and suspend implement 100. Alternatively, adjustment device 112 may be an electrical, pneumatic, or mechanical device which may be controlled by an electrical, pneumatic, or mechanical controller or manual adjustment.

Disk gangs 116, of which implement 100 has four, are pivotally connected to frame 106 so as to allow disk gangs 116 to roll along the ground when implement 100 is towed in travel direction 102. Disk gangs 116 are ground-engaging tool assemblies, each of which includes a plurality of disks 118. Disks 118 may engage the ground to work a field or area, including to break up chunks of soil or debris and smooth the surface of the field. In alternative configurations, disks 118 may be used to create furrows in a field. Disks 118 may exert a force on the ground, the magnitude of which may be adjusted such as through the pressurization and actuation of adjustment device 112 by valve 114.

Rolling baskets 120, of which implement 100 has three, are pivotally connected to frame 106 so as to allow them to roll along the ground while implement 100 is towed in travel direction 102. Rolling baskets 120 are ground-engaging tools which may break up chunks of soil or debris and smooth the surface of the field. Rolling baskets 120 may exert a force on the ground, the magnitude of which may be adjusted such as through the pressurization and actuation of adjustment device 112 by valve 114.

One or more sensors may be configured to measure the downward force exerted by disk gangs 116 or rolling baskets 120. Such sensors may directly measure the downward force of one of the ground-engaging tools such as by directly measuring the force such a tool is exerting on frame 106 (e.g., pressure transducer, strain gauge, load cell, draft link, instrumented pin). Alternatively, such sensors may measure the downward force exerted by wheels 110, such as through a pressure sensor measuring the pressure in the hydraulic cylinder of adjustment device 112, and calculate the downward force necessarily exerted by the ground-engaging tools to support implement 100.

Downward force is used to turn each of disk gangs 116 and rolling baskets 120, as each are rotated by the tangential force exerted by their engagement with the ground. Soil and debris may collect between and around moving elements of the ground-engaging tools and reduce the effectiveness of the tools, including by inhibiting the movement of soil through the tool and resisting its rotational motion. This action of collecting soil and debris, which may be referred to as plugging or jamming, may eventually provide enough rotational resistance that the rotational speed of ground-engaging tool may slow so that it is being partially dragged rather than rolled over the ground. The ground-engaging tool may also stop rotating entirely. This may create an uneven surface in the field or area being worked, as the slowed or stopped tool may not break up soil and debris and smooth the surface as intended, and instead may create furrows, hills, or other features instead of removing them.

The rotational speed of the ground-engaging tools may be measured by a sensor, such as first speed sensor 122 which is configured to measure the rotational speed of one of disk gangs 116. First speed sensor 122 is a magnetic sensor which is affixed to a portion of frame 106 in proximity to one of disk gangs 116 so that it may sense the presence of magnet 124. First speed sensor 122 is affixed to frame 106 such that it does not rotate as implement 100 moves. Magnet 124 is affixed to a rotating component of one of disk gangs 116, such as one of disks 118, so as to rotate with one of disk gangs 116 and pass by first speed sensor 122 on each rotation. Similarly, second speed sensor 126 may be configured to measure the rotational speed of one of rolling baskets 120. Second speed sensor 126 is a magnetic sensor which is affixed to a portion of frame 106 in proximity to one of rolling baskets 120 so that it may sense the present of magnet 128. Magnet 128 is affixed to a rotating component of one of rolling baskets 120 so as to pass by second speed sensor 126 on each rotation. The rotational speed of the ground-engaging tools may be measured in any number of different manners, including through the use of magnetic (e.g., Hall Effect, giant magnetoresistance), inductive, capacitive, proximity, and optical (e.g., optical encoding, cameras) sensors.

Figure 2:
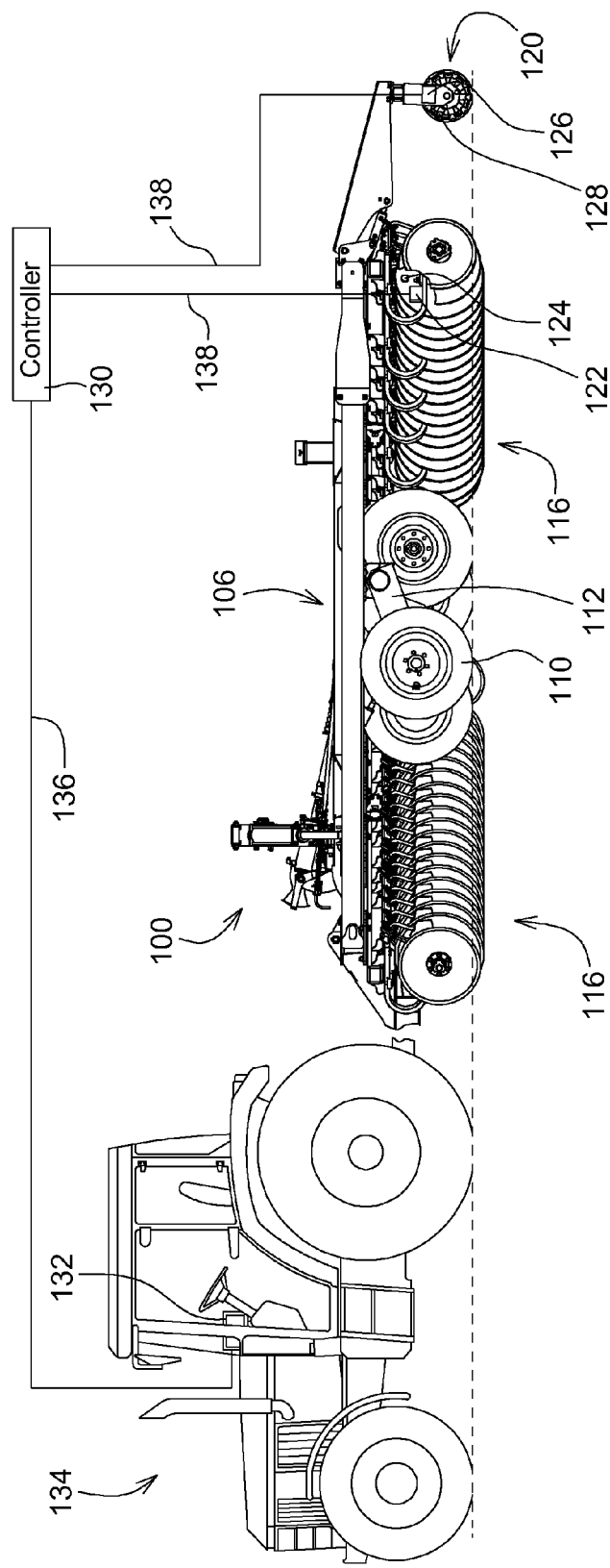
FIG. 2 is a side view of an agricultural vehicle towing the agricultural implement.

Referring to FIG. 2, first speed sensor 122 and second speed sensor 126 each provide a signal indicative of a rotational speed of their respective ground-engaging tools to implement controller 130, which is in communication with first speed sensor 122, second speed sensor 126, vehicle controller 132 on agricultural vehicle 134, and may also be in communication with other components and sensors on implement 100 such as valve 114 (shown in FIG. 1). Implement controller 130, which may also be referred to as an implement controller or implement control unit, may communicate with these and other components via a wire harness (e.g., via voltage level, current level, CAN messages), radio communications, or other communication pathways. For example, implement controller 130 may be in communication with vehicle controller 132 via CAN (Controller Area Network) bus 136 to which other components are also connected. Implement controller 130 may be in communication with first speed sensor 122 and second speed sensor 126 via wire harness 138. Implement controller 130, CAN bus 136, and wire harness 138 are illustrated schematically in FIG. 2, but may be connected to frame 106 and positioned near valve 114, run along frame 106 through a connector to agricultural vehicle 134, and run along frame 106, respectively, to name but one potential combination of positions for those components. As another example, first speed sensor 122 and second speed sensor 126 may communicate with implement controller 130 via radio signals. In such an example, the wiring needs for first speed sensor 122 and second speed sensor 126 may be further reduced if each sensor is powered by energy they harvest rather than power carried to them by a wiring harness. The sensors may harvest energy through the capture of current generated by their movement through magnetic fields created by their paired magnets as the sensors or magnets rotate with the ground-engaging tool. Energy may also be harvested from implement vibration or from the environment, such as from sunlight or wind.

In the embodiment illustrated in FIG. 2, implement controller 130 may receive a signal indicative of the ground speed of implement 100, or the speed of implement 100 in travel direction 102. Vehicle controller 132 may determine the ground speed of agricultural vehicle 134, for example through signals from rotary speed sensors on an engine, transmission, or wheel or a GNSS (Global Navigation Satellite System) receiver, and may broadcast this speed on CAN bus 136 so that implement controller 130 may receive it. Alternatively, implement controller 130 may itself determine the ground speed of implement 100, for example based on a signal received from rotary speed sensor on one of wheels 110, a GNSS receiver which may be integrated into implement controller 130, a ground speed radar unit, or a local position system (LPS).

Implement controller 130 compares the ground speed to the rotational speeds indicated by the signals it receives from first speed sensor 122 and second speed sensor 126. The ratio of the rotational speed indicated by first speed sensor 122 to ground speed and the ratio of the rotational speed indicated by second speed sensor 126 to ground speed should each remain substantially constant when none of the ground-engaging tools are slipping, as each ground-engaging tool should be rotated by the ground at a speed proportional to ground speed. Alternatively, implement controller 130 could be referred to as calculating a tool ground speed based on the signal received from first speed sensor 122 or second speed sensor 126 and a known diameter of disk gangs 116 or rolling baskets 120 and comparing that tool ground speed to the ground speed of implement 100.

If implement controller 130 detects that the ratio of the rotational speed of either disk gangs 116 or rolling baskets 120 to ground speed indicates that one of the ground-engaging tools is slipping or has stopped, it may send an alert signal. In the embodiment illustrated in FIG. 2, implement controller 130 may send this alert signal over CAN bus 136 to vehicle controller 132. Vehicle controller 132 may receive this alert and communicate it to an operator in the cab of agricultural vehicle 134, such as through a haptic (e.g., seat vibration, steering wheel vibration), visual (e.g., warning lamp, flasher, message or icon on a display), or audible (e.g., piezoelectric speaker) alarm. As one example, the seat may be vibrated with a magnitude, frequency, or pattern which is indicative of the type or severity of the plug.

Vehicle controller 132 may also optionally control other components in response to such an alert signal, such as reducing the speed of agricultural vehicle 134 or stopping it entirely, or sending the alert signal to a remote server where it can be logged or acted upon. Either implement controller 130 or vehicle controller 132 may also command valve 114 to decrease pressure in, or remove hydraulic fluid from, adjustment device 112 in order to decrease the downward force exerted by wheels 110 and thereby increase the downward force exerted by the ground-engaging tools on implement 100. This increased downward force may increase the force exerted by the ground on the ground-engaging tool and allow it to rotate through, or clear, the plug or jam. In some circumstances, implement controller 130 or vehicle controller 132 may also command valve 114 to increase pressure in, or add hydraulic fluid to, adjustment device 112 in order to increase the downward force exerted by wheels 110 and thereby decrease the downward force exerted by the ground-engaging tools on implement 100. This decreased downward force may decrease the depth of the ground-engaging tool and allow soil or debris to clear from the tool. Implement controller or vehicle controller 132 may determine whether to increase or decrease the downward force exerted by the ground-engaging tools based on the conditions of the field or area being worked, the location of implement 100, or operating characteristics such as the speed or power of agricultural vehicle 134.

In certain applications, the operator may not immediately notice that a ground-engaging tool is plugged, it may be difficult for the operator to detect a plug, or it may be difficult to detect a partial plug which is causing suboptimal implement performance. Detecting a plug and notifying the operator may reduce the amount of time implement 100 is operated in a plugged state, which may help reduce how long implement 100 is operated suboptimally, the amount of damage done to a field or area, or how much rework is necessary.

In alternative embodiments, implement 100 may be towed by an agricultural vehicle without an operator or with a supervisory operator (either in the vehicle or remote) who monitors the vehicle but only provides corrections and overrides as necessary. In such embodiments, particularly in those without an operator in the vehicle, it may be difficult to discern that implement 100 is plugged and it may be operated for a length of time while plugged. For those embodiments, implement controller 130 or vehicle controller 132 may command the vehicle to stop and/or the controllers may send an alert to a supervisory operator or other person that implement 100 needs to be checked.

As one example, implement controller 130 or vehicle controller 132 may provide remote monitoring capabilities through radio communications, such as through satellite or cellular communication networks. Either controller may send a signal indicative of any of the ground speed of agricultural vehicle 134, rotational speed of a ground engaging-tool, ratio of the rotational speed of a ground-engaging tool to the ground speed of agricultural vehicle 134, the rotational speed of a ground-engaging tool as a percent of its nominal or no-slip rotational speed at the given ground speed, and a plug alert. Such signals may be time-stamped or georeferenced to provide further information. Such signals may be used to remotely monitor and control agricultural vehicle 134 and implement 100. Such signals may also be processed at implement controller 130, vehicle controller 132, or at a remote server to provide further information on a potential plug such as which vehicle it is on or the vehicle's location (e.g., "Vehicle 1, located at 41.476508 −90.425909, has a plug"), which ground-engaging tool is potentially plugged (e.g., "Disk gang 2 of Vehicle 1 is plugged"), and how the ground-engaging tool is currently performing (e.g., "Disk gang 3 of Vehicle 1 is rotating at 50% of nominal"). As one example, an alternative embodiment may include a controller which slows or stops the vehicle if the controller detects that a ground-engaging tool is rotating too slowly for the vehicle's groundspeed, then sends a plug alert signal to a remote server which can be viewed by a remote supervisor or operator along with vehicle location or implement performance information.

Figure 3:
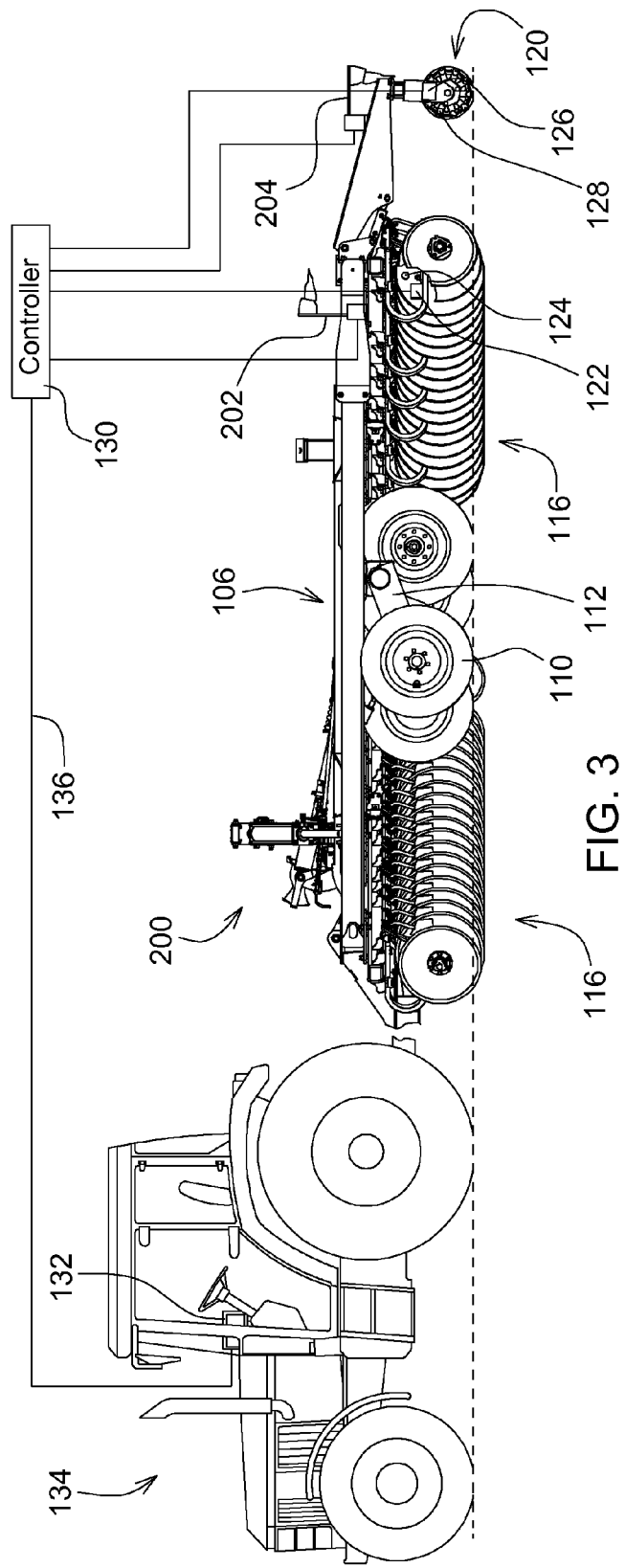
FIG. 3 is a side view of the agricultural vehicle towing an alternative embodiment of the agricultural implement.

FIG. 3 illustrates an embodiment in which implement controller 130 of implement 200 may receive the speed of agricultural vehicle 134 from vehicle controller 132 over CAN bus 136, but does not send an alert signal back to vehicle controller 132. Instead, implement controller 130 activates visual alarm 202 if it determines that one of disk gangs 116 is plugged and activates visual alarm 204 if it determines that one of rolling baskets 120 is plugged. In this embodiment, both of visual alarm 202 and visual alarm 204 are flags which may be raised to send an alert, or lowered when no alert is desired. Alternatively, other alarms such as flashing lights or audible alarms which may be heard by an operator in agricultural vehicle 134 may be used. Additionally, instead of individual alarms being used for each ground-engaging tool, a signal system may set up which activates one alarm and then provides a visual indication of which ground-engaging tool is plugged (e.g., one alarm with six different lights to show which tool plugged). FIG. 3 illustrates a situation where one of disk gangs 116 is plugged and the corresponding visual alarm 202 is active but where none of rolling baskets 120 are plugged and the corresponding visual alarm 204 is not active.

Figure 4:
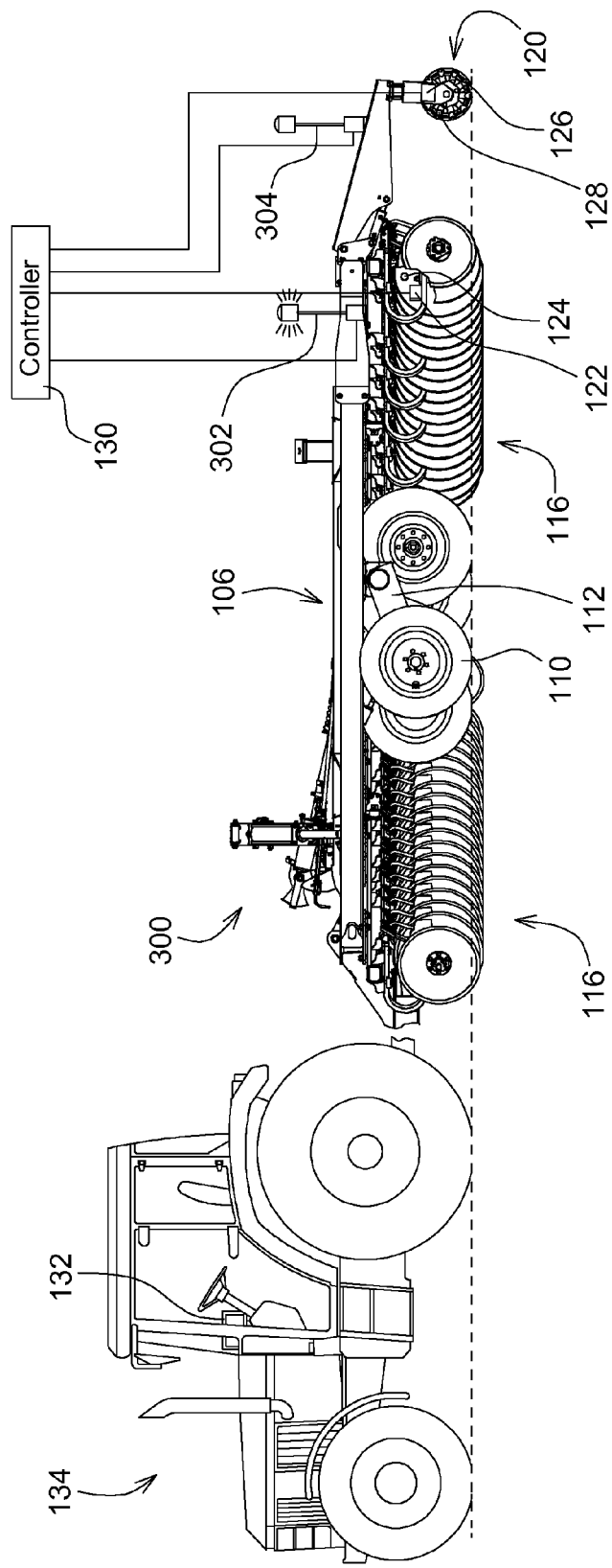
FIG. 4 is a side view of the agricultural vehicle towing another alternative embodiment of the agricultural implement.
Figure 5:
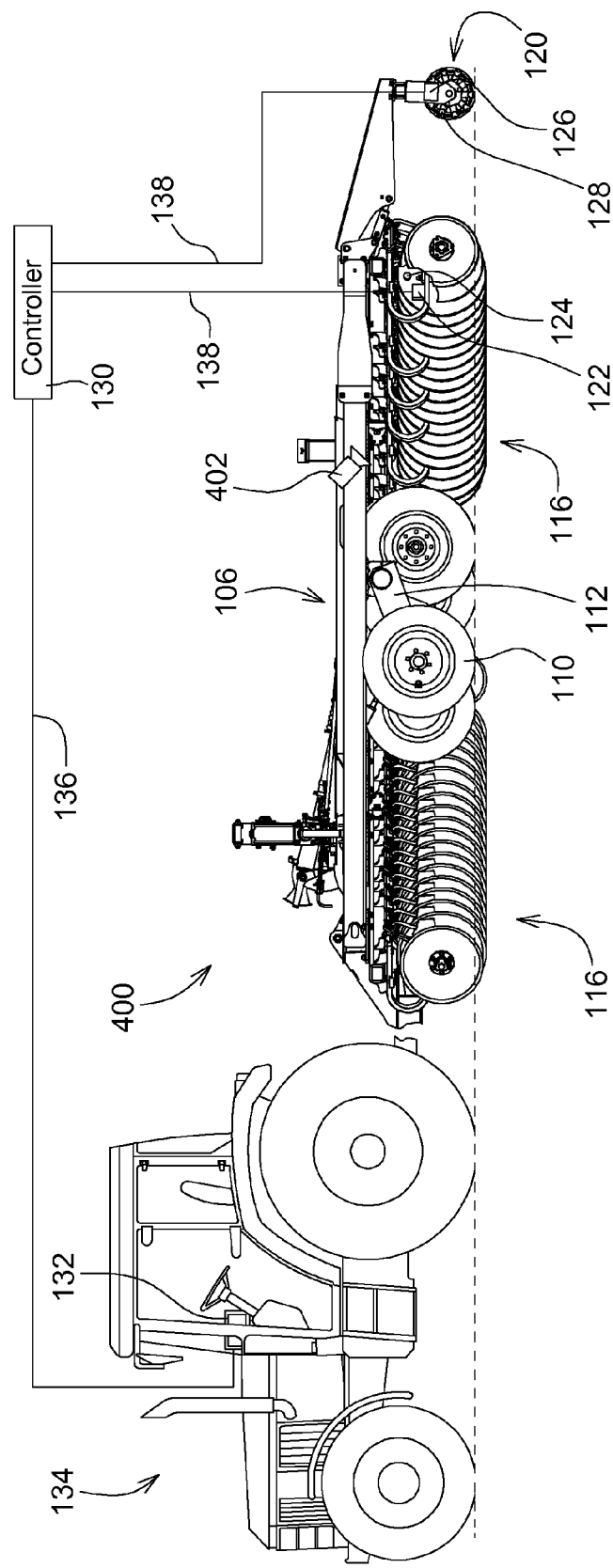
FIG. 5 is a side view of the agricultural vehicle towing another alternative embodiment of the agricultural implement.

FIG. 4 illustrates an embodiment in which implement controller 130 of implement 300 does not communicate with vehicle controller 132. In this embodiment, implement controller 130 determines the ground speed of implement 100 based on signals from a GNSS receiver integrated into implement controller 130. Implement controller 130 activates visual alarm 302 if it determines that one of disk gangs 116 is plugged and activates visual alarm 304 if it determines that one of rolling baskets 120 is plugged. Visual alarm 302 and visual alarm 304 are each lights that may be visible by an operator in the cab of agricultural vehicle 134. FIG. 4 illustrates a situation where one of disk gangs 116 is plugged and the corresponding visual alarm 302 is active but where none of rolling baskets 120 are plugged and the corresponding visual alarm 304 is not active FIG. 5 illustrates an embodiment where implement 400 includes camera 402 mounted on frame 106 and configured to provide a view of one of disk gangs 116. Camera 402 may be utilized to provide a secondary data point that can confirm a plug in a ground-engaging tool of implement 100, as further described below with regard to FIG. 7. Camera 402 may be in communication with implement controller 130 and/or with vehicle controller 132 so as to provide image information. In alternative embodiments, camera 402 may be mounted on agricultural vehicle 134 rather than on implement 400.

Figure 6:
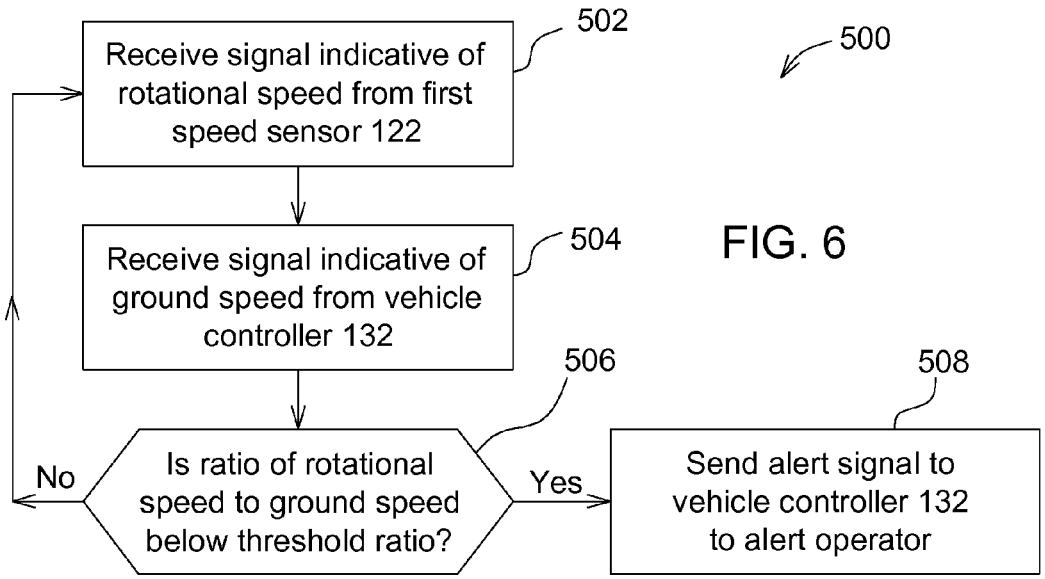
FIG. 6 is a flow-chart of a method of plug detection for an agricultural implement.

FIG. 6 is a flow chart of control system 500, which may be executed by implement controller 130. In step 502, implement controller 130 receives a signal indicative of a rotational speed of a ground-engaging tool, in this case one of disk gangs 116, from first speed sensor 122. This signal may be in the form of an electrical pulse or a count which is transmitted from first speed sensor 122 to implement controller 130 each time magnet 124 passes first speed sensor 122. Implement controller 130 may use the frequency or time between pulses to determine the rotational rate of one of disk gangs 116. These calculations may be adjusted if more than one magnet is used. Alternatively, first speed sensor 122 may itself calculate the rotational rate of one of disk gangs 116 based on the number of magnets that pass it per rotation and the frequency with which it detects a passing magnet, and then send a signal (e.g., a CAN message) to implement controller 130 containing the rotational rate. Alternatively, first speed sensor 122 may be configured to provide a signal indicative of the rotational speed of one of disk gangs 116 in a different manner, including through the use of magnetic (e.g., Hall Effect, giant magnetoresistance), inductive, capacitive, proximity, and optical (e.g., optical encoding, camera) mechanisms.

In step 504, implement controller 130 may receive a signal indicative of ground speed from vehicle controller 132. Vehicle controller 132 may determine ground speed, or the ground speed in travel direction 102, based on the rotational speed of a component such as an engine, transmission, wheel, or shaft connected thereto and converting such rotational speed into a ground speed. Alternatively, vehicle controller 132 may determine ground speed based on signals from a GNSS receiver or a ground speed radar unit, to name but a few examples. Vehicle controller 132 may provide this ground speed in the form of a CAN message broadcast by vehicle controller 132 on CAN bus 136.

In step 506, implement controller 130 may determine whether the ratio of rotational speed to ground speed is below a threshold ratio. This step may be determined through the comparison of the ratio of rotational speed to ground speed and a threshold ratio which may be preprogrammed, operator-adjustable, and/or dynamically determined. The threshold ratio may be set to a portion of the ratio associated with no slippage between the ground-engaging tool and the ground.

The ratio associated with no slippage may be calculated using the effective rolling diameter. For example, if the effective rolling diameter of disk gangs 116 is one meter, the ratio associated with no slippage between disk gangs 116 and the ground is approximately 3.14 if ground speed is measured in meters per second and rotational speed is measured in rotations per second. Depending on how unit conversions are handled, the value for the ratio may change. For example, if the effective rolling diameter of disk gangs 116 is one meter, ground speed is measured in kilometers per hour, and rotational speed is measured in rotations per minute, the ratio associated with no slippage is approximately 5.3 if no unit conversion is done.

The ratio associated with no slippage, or the no-slip ratio, may also be determined based on usage or input by an operator. For example, an operator may use agricultural vehicle 134 to tow implement 100 through a field and command implement controller 130, such as through actuation of an operator input, to record the current ratio between rotational speed and ground speed when the operator believes that no slippage is occurring. This value may later be used to calculate the threshold ratio. Alternatively, implement controller 130 may automatically calculate or record the ratio between the rotational speed of a ground-engaging tool and ground speed at regular intervals or when the ratio has been consistent for a period of time, in order to automatically determine a ratio associated with no slippage.

The threshold ratio may be determined based on the ratio associated with no slippage. For example, the threshold ratio may be set to be a portion of the ratio associated with no slippage, such as 60% (e.g., if the ratio associated with no slippage is 5.3, the threshold ratio may be 3.18). Utilizing a threshold ratio below the no-slip ratio may aid in preventing false alarms or false plug detections associated with minor variances in rotational or ground speed or inaccuracies in sensing either speed. Utilizing a lower threshold ratio may also avoid alarms for minor plugs, which may clear themselves or may not substantially impact the performance of implement 100. The threshold ratio may be set by the equipment manufacturer based on data collected from the operation of implement 100 or an analogous implement, or it may be set by an operator or owner of implement 100.

The threshold ratio may also be dynamically or user-adjustably set relative to the ratio associated with no slippage. As one example, implement controller 130 and vehicle controller 132 may adjust the threshold ratio based on ground speed or the conditions of the field currently being worked, such as through direct sensing of conditions or utilizing location information to retrieve local condition information stored on the controllers or accessible on a remote server (e.g., soil type, soil moisture, crops residue, recent rainfall, temperature). For example, if the soil is sandy, the threshold ratio may be decreased by 5% to reduce false alarms as plugging is less likely. As another example, as the ground speed increases, the threshold ratio may be increased if speed measurement errors are less likely to cause false alarms at higher speeds or the threshold ratio may be decreased to reduce missed alarms which may cause more damage to the field at higher speeds.

As another example, an operator may use an interactive display or other operator input in agricultural vehicle 134 to increase or decrease the threshold ratio if too many false alarms or missed alarms are occurring. In such an example, the manufacturer may set the threshold ratio to 60% of the no-slip ratio, but the operator may modify this to 65% of the no-slip ratio.

In the embodiment illustrated in FIG. 6, implement controller 130 determines a threshold rotational speed based on the ground speed by utilizing a threshold ratio of rotational speed to ground speed. Implement controller 130 then compares the ratio of rotational speed from first speed sensor 122 to ground speed from vehicle controller 132 with the threshold ratio, and sends an alert signal if the actual ratio falls below the threshold ratio. This same comparison and determination may be rearranged or reconfigured in alternative embodiments. As one example, implement controller 130 may determine a threshold rotational speed instead by multiplying the threshold ratio by the ground speed and comparing that threshold rotational speed with the actual rotational speed from first speed sensor 122. As another example, implement controller 130 may multiple the rotational speed indicated by first speed sensor 122 (in rotations per hour) by the effective diameter of one of disk gangs 116 (in kilometers) and pi to find a tool ground speed (in kilometers per hour) that may be compared to a threshold tool ground speed that is based on (for example, 60% of) the ground speed indicated by second speed sensor 126. There are a number of alternative methods by which to determine a threshold rotational speed based on the ground speed and determine whether the actual rotational speed is above the threshold rotational speed.

Although referred to as a "threshold" rotational speed above, the same concept may also be referred to as an acceptable "range" of rotational speeds (i.e., those speeds above the threshold rotational speed).

By utilizing a threshold ratio in FIG. 6, implement controller 130 utilizes a threshold rotational speed which is proportional to ground speed. In alternative embodiments, the threshold rotational speed may not be perfectly proportional to the ground speed but may be substantially proportional to the ground speed such that ground speed is the largest determinant of the threshold rotational speed and other factors, such as absolute speed and acceleration, are lesser determinants.

Step 506 may also include a time component whereby implement controller 130 determines whether the ratio of rotational speed to ground speed is below the threshold ratio for a minimum period of time, for example one second, before performing step 508.

If the ratio of rotational speed to ground speed is not below the threshold ratio, step 502 is performed next. If the ratio of rotational speed to ground speed is below the threshold ratio, step 508 is performed next. In step 508, implement controller 130 sends a plug alert signal to vehicle controller 132, which may be in the form of a CAN message transmitted via CAN bus 136. Upon receipt of this signal, vehicle controller 132 may display a message or trigger an alarm to alert the operator of a plug in implement 100. Alternatively, step 508 may not send an alert signal to vehicle controller 132 and may instead directly trigger an alarm, for example with implement 200 and implement 300 the activation of visual alarm 202, visual alarm 204, visual alarm 302, or visual alarm 304.

Figure 7:
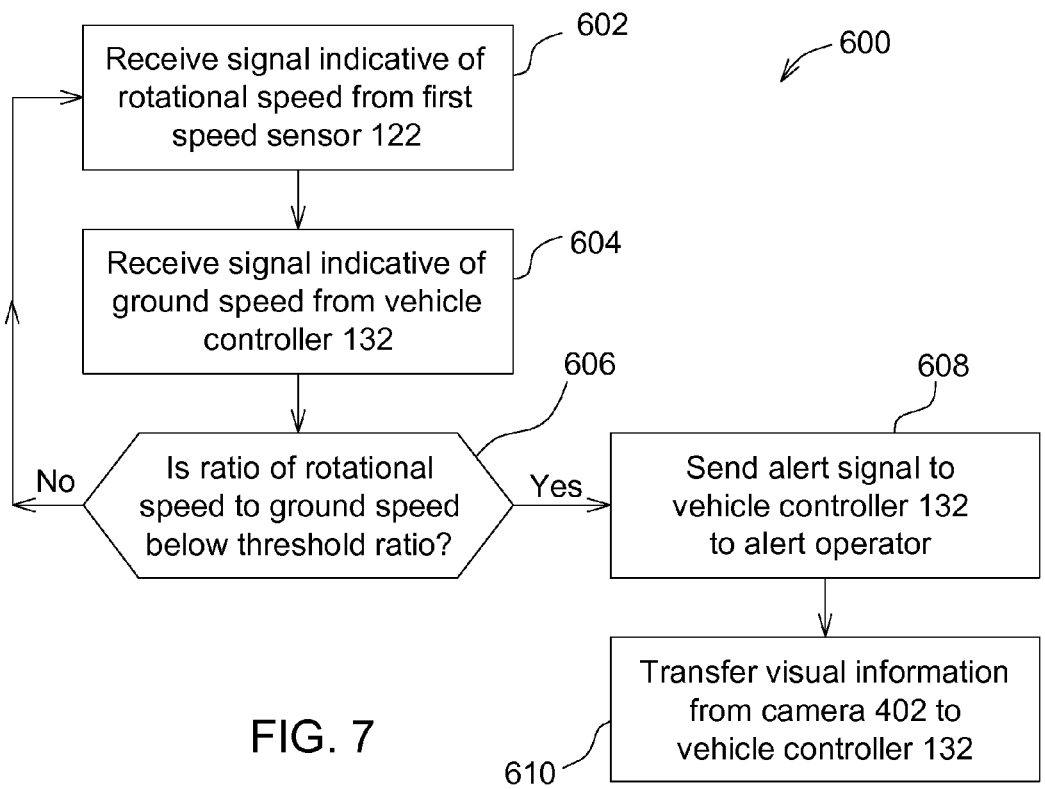
FIG. 7 is a flow-chart of an alternative method of plug detection for an agricultural implement.

FIG. 7 is a flow chart of control system 600, which may be executed by implement controller 130. In step 602, implement controller 130 receives a signal indicative of a rotational speed of a ground-engaging tool, in this case one of disk gangs 116, from first speed sensor 122. In step 604, implement controller 130 receives a signal indicative of ground speed from vehicle controller 132. In step 606, implement controller 130 determines whether the ratio of rotational speed to ground speed is below a threshold ratio. If the ratio of rotational speed to ground speed is not below the threshold ratio, step 602 is performed next. If the ratio of rotational speed to ground speed is below the threshold ratio, step 608 is performed next. In step 608, implement controller 130 sends a plug alert signal to vehicle controller 132, which may be in the form of a CAN message transmitted via CAN bus 136. Upon receipt of this signal, vehicle controller 132 may display a message or trigger an alarm to alert the operator of a plug in implement 100.

In step 610, implement controller 132 may transfer visual information from camera 402 to vehicle controller 132. Such visual information may consist of video or still frames captured by camera 402 of a ground-engaging tool. Implement controller 132 may transfer such information without further processing, or may first process the information, for example to improve the quality of the image or video or to filter or analyze the information. Upon receiving such information, vehicle controller 132 may display the information for the operator of agricultural vehicle 134, for example by displaying video on a screen in view of the operator. The operator may utilize this information to decide on the appropriate course of action, which may be to ignore the plug alert signal because it is a false alarm or the plug is not significantly affecting the performance of the ground-engaging tool, or to take action to clear the plug.

Although FIG. 6 and FIG. 7 are illustrated as flowcharts, the present disclosure is not limited to such steps and the order of steps of presented, and such steps may be reordered, combined, or split and achieve the same result.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A plug detection system for an agricultural implement comprising a ground-engaging tool, the plug detection system comprising:
   a rotational speed sensor configured to detect a rotational speed of the ground-engaging tool;
   a ground speed sensing system configured to detect a ground speed of the agricultural implement; and
   a controller in communication with the rotational speed sensor and the ground speed sensing system, the controller configured to:
      determine a threshold rotational speed based on the ground speed; and
      send an alert signal when the rotational speed is below the threshold rotational speed.

2. The plug detection system of claim 1, further comprising a magnet connected to the ground-engaging tool so as to rotate with the ground-engaging tool, wherein the rotational speed sensor is connected to the implement so as not to rotate with the ground-engaging tool and wherein the rotational speed sensor is configured to detect the rotational speed of the ground-engaging tool by detecting the passage of the magnet as the ground-engaging tool rotates.

3. The agricultural implement of claim 1, wherein the threshold rotational speed is substantially proportional to the ground speed.

4. The plug detection system of claim 1, further comprising an operator interface in communication with the controller and configured to provide an audio, visual, or haptic alarm to an operator based on receipt of the alert signal.

5. The plug detection system of claim 1, wherein the ground-engaging tool is at least one of a disk gang or a rolling basket.

6. The plug detection system of claim 1, wherein the agricultural implement comprises an adjustment device configured to adjust the downward force exerted by the ground-engaging tool, and the controller is configured to send a command signal to actuate the adjustment device when the rotational speed is below the threshold rotational speed.

* * * * *